United States Patent Office 2,997,524

Patented Aug. 22, 1961

2,997,524

PROTECTED PRINTED CIRCUITS AND CONTACTS

Simon L. Ruskin, 32 E. 67th St., New York 21, N.Y.; Dan Ruskin, Milton Reder, and Carol Fabri, executors of said Simon L. Ruskin, deceased No Drawing. Filed Nov. 21, 1957, Ser. No. 697,792
1 Claim. (Cl. 174—126)

My invention relates to printed circuits and contacts whereby oxidation and scaling of the contact areas are diminished and a long term protection of the contact areas assured. With printed circuits and multiple contacts such as are found in calculator machines, oxidation and scaling represent a very costly source of maintenance expense. Similarly, in contact areas such as batteries, spark plugs, fuses and electrical contacts, generally, the life of the contact is seriously impaired by oxidation and scaling.

I have found that a printed circuit such as is commonly used in radio and television circuits or other multiple contacts, exposed circuits can be protected for prolonged periods of time by a thin coating of the metal, rhenium. This can be readily applied to the exposed or contact area by a process known as powder welding wherein the finely subdivided rhenium powder is blown under pressure in an inert or reducing atmosphere and flash heated immediately before application to the printed circuit or contact. By this procedure of powder welding, a firm plating of rhenium on the copper or other metallic conductor is formed. The rhenium acts as a long-time protector against oxidation of the exposed areas of the electrical contacts.

Rhenium is a metal discovered in 1925 and has the atomic number, 75, and is also known as dul-manganese. It forms various halogen compounds, some organic compounds, various acids and salts as well as oxides.

I have found that rhenium, on exposure to air and heated to 160° C. or above, oxidizes to rhenium heptoxide, but the oxide is a volatile solid which is very deliquescent and readily combines with moisture of the air to form perrhenic acid which evaporates leaving always a fresh metallic surface for electrical contact.

Rhenium heptoxide dissolves in alcohol, acetone and methyl alcohol, so that contacts are easily wiped free of rhenium heptoxide. Rhenium may be applied to any other metal surface as a coating. It is a blackish looking metal.

Rhenium may also be applied on metallic surfaces as a coating. Rhenium can be obtained in the colloidal state from potassium rhenichloride or potassium perrhenate in hydrochloric acid in the presence of gum arabic, by reduction on warming with 1% hydrazine and formaldehyde. The colloid may be purified by dialysis. Rhenium in this form catalyzes the decomposition of hydrogen peroxide, the synthesis of ammonia and the hydrogenation of maleic and cinnamic acid. I have found that, in addition, it catalyzes the formation of water from electrolytically dissociated water leading to instantaneous recombination of hydrogen and oxygen. It thus prevents gas pressure in batteries and can be used for the recombination of dissociated deuterium oxide.

I may employ the colloidal rhenium as a coating on metallic or ceramic surfaces, on pellets or beads. I may also use the colloidal rhenium as a paint or in combination with other coatings such as silicones. Rhenium resists high temperatures and may be heated to 3160° C., and provides excellent high temperature electrical contacts.

*Example I*

A copper printed circuit for a radio set was treated by powder welding with a 1 millimeter thickness of rhenium. The copper exposed in the print took on a blackish silvery apperance. Exposure to air showed no evidence of change of color or scaling of any kind, thus evidencing continued contact surface.

*Example II*

The electrical contacts of a spark plug were coated by powder welding with rhenium. The contact took on a blackish silvery appearance. Continued use showed no evidence of change in color or scaling.

*Example III*

A button type electrical contact was treated by powder welding with rheinum to form a 1 millimeter layer. The button took on a blackish silvery color. Continued use of the electrical contact showed no change in color or evidence of scaling.

*Example IV*

A 2 millimeter thick layer of rhenium metal was fused to a copper telegraphic contact plate covering the entire contact area of the copper. The key button was like covered by a cap of rhenium fused on to the button. Continued use of the telegraphic key showed no evidence of surface oxidation or scaling.

*Example V*

A rocket fuse contact was covered with rhenium by powder welding. The rhenium fuse contact resisted high temperature oxidation.

*Example VI*

A thermionic valve was coated on its electrical contact areas by powder welding with a 1 millimeter layer of rhenium. Continued freedom from oxidation and scaling resulted.

*Example VII*

100 mg. colloid rhenium enclosed in a small sieve like packet is placed in the upper compartment of a nickel cadmium battery. No gas pressure develops and released gases are recombined to form water.

*Example VIII*

To 500 lbs. of deuterium oxide circulating in an atomic reactor, is added 200 grams of colloidal rhenium. Dissociated deuterium oxide promptly recombines to form deuterium oxide while circulating in the atomic reactor.

What I claim is:

An oxidation-resistant electrical conductor comprised of a copper base having an exterior protective coating of rhenium thereon of about 1 mm. thickness.

References Cited in the file of this patent

UNITED STATES PATENTS 2,303,497 Reeve ---------------- Dec. 1, 1942

OTHER REFERENCES

Rare Metals Handbook, published Reinhold Publishing Corp., 1954, New York, N.Y., pages 360 and 361. (Copy in Div. 14.)